WIDE RANGE ELECTRONIC SWEEP CIRCUIT

Filed Feb. 21, 1957

INVENTOR:
FRANCIS H. SHEPARD JR.
BY
Curtis, Morris & Safford
ATTORNEYS.

Aug. 2, 1960 F. H. SHEPARD, JR 2,947,910

WIDE RANGE ELECTRONIC SWEEP CIRCUIT

Filed Feb. 21, 1957

2 Sheets-Sheet 2

INVENTOR:
FRANCIS H. SHEPARD JR.
BY
Curtis, Morris & Safford.
ATTORNEYS:

2,947,910

WIDE RANGE ELECTRONIC SWEEP CIRCUIT

Francis H. Shepard, Jr., Lee Lane, Berkley Heights, N.J.

Filed Feb. 21, 1957, Ser. No. 641,653
8 Claims. (Cl. 315—163)

Figure 1:
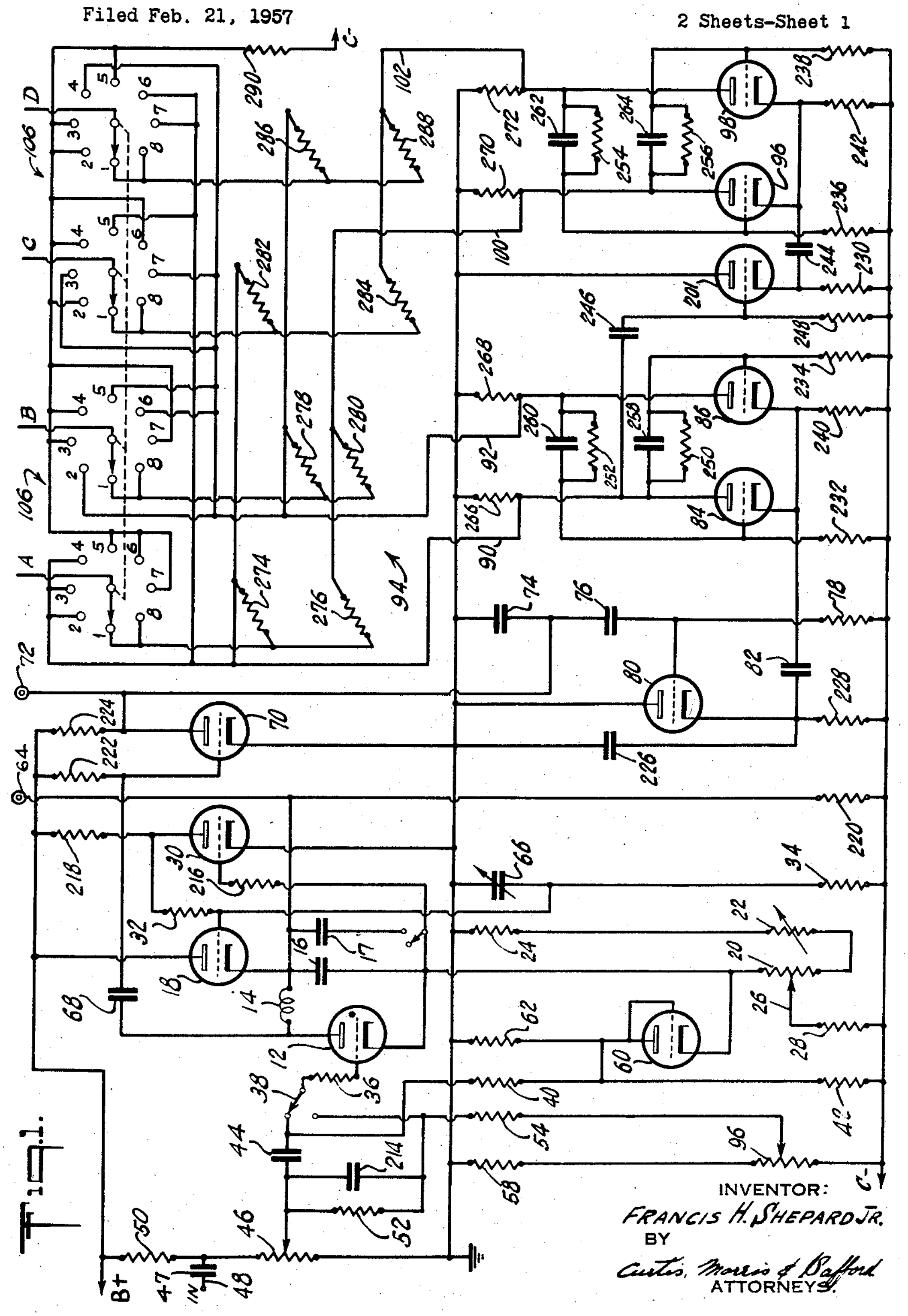

This invention relates to an apparatus for electronically making and breaking each of a number of separate electric circuits in rapid and timed sequence.

An object of this invention is to provide for the high-speed switching from one electric circuit to another with a minimum of delay and of distortion due to the switching.

A more specific object is to provide an electronic switch by which, for example, a number of separate electric signals can be applied in sequence to the input of a single channel oscilloscope, or the like, and displayed simultaneously thereon.

A further object is to provide apparatus of the above type which has a circuit by which the frequency of the switching can be controlled over an extremely wide-range.

Another object is to provide a very simple and inexpensive electronic device capable of switching a circuit on or off instantaneously and at high repetition rates.

Another object is to provide a novel circuit which produces a signal having an extremely linear saw-tooth waveform at a selected frequency easily variable over a range, for example, of ten thousand to one.

Still another object is to provide such an apparatus which is not only efficient, but relatively simple and inexpensive.

These and other objects will in part be understood from and in part pointed out in the description of the invention given hereinafter.

The exceptional usefulness of the present invention is evident, for example, in working with vacuum tube amplifiers where it is often necessary to adjust the operating conditions of the tubes to relatively critical values in order to obtain proper performance. Often when such is the case, changing one variable, for example, plate supply voltage, makes necessary the changing of others, such as grid bias and signal voltage, since these variables are interrelated and interdependent. One of the most convenient ways of ascertaining the proper values of such variables is to display each separately but simultaneously with the others on a cathode-ray oscilloscope. Thus the output of the amplifier for any input and with various operating parameters can be seen immediately and the optimum output chosen by inspection.

Unfortunately, cathode-ray oscilloscopes having a number of separate channels, through which a corresponding number of variable signals can be fed to the screen of the scope, are relatively complex and expensive. For this reason they are seldom available in the average laboratory or to most engineers. On the other hand, by connecting a multi-channel switch of one kind or another to the input of a single channel oscilloscope, each one of a number of different signals can be switched in rapid sequence to the input and, in effect, displayed simultaneously on the oscilloscope. Such switches in the past, however, have been unduly complicated, inefficient, or limited in versatility.

The present invention seeks to provide an improved electronic switch capable of outstanding performance. It will be understood, of course, that although the invention is described in relation to multi-channel display on an oscilloscope, it is not limited to this specific use even though this serves well to illustrate the general principles of the invention.

In accordance with one aspect of this invention, high-speed switching is accomplished by the use of a very low cost two electrode gas discharge tube, such as a type NE–2 neon gas discharge tube costing less than a nickel, which is connected in an advantageous way to a unique radio-frequency control circuit. This control circuit causes the ionizable gas in the tube to conduct or not conduct as desired, and is effectively independent of the conductive current-path through the tube. The ionized gas current or gas discharge between the electrodes of this tube is, in effect, a low resistance direct contact between the tube electrodes; whereas, when no discharge exists, the open circuit resistance of this path is nearly infinite. Since this path can be established or interrupted repeatedly and effectively instantaneously a very useful electric switch is obtained.

The unique control circuit for the gas tube in such a switch includes a radio-frequency oscillator which is turned on whenever a bias voltage signal is applied to it. Such a bias signal may be obtained from a device known as a "pulse counter" which controls the timing of the switching in fixed relation to the frequency of the novel saw-tooth generating circuit provided in accordance with the invention. This generating circuit produces a very linear saw-tooth wave which, if desired, can be used to drive the horizontal sweep of an oscilloscope, for example. The frequency of this wave is easily variable by a unique arrangement over a range, for example, of the order of ten thousand to one. Even though variable over such a wide range, the wave remains quite linear. Since the sequence of switching in the overall apparatus is ultimately controlled by this saw-tooth wave, complete synchronism between the horizontal and vertical sweeps of an oscilloscope can easily be obtained.

Figures 2, 3:
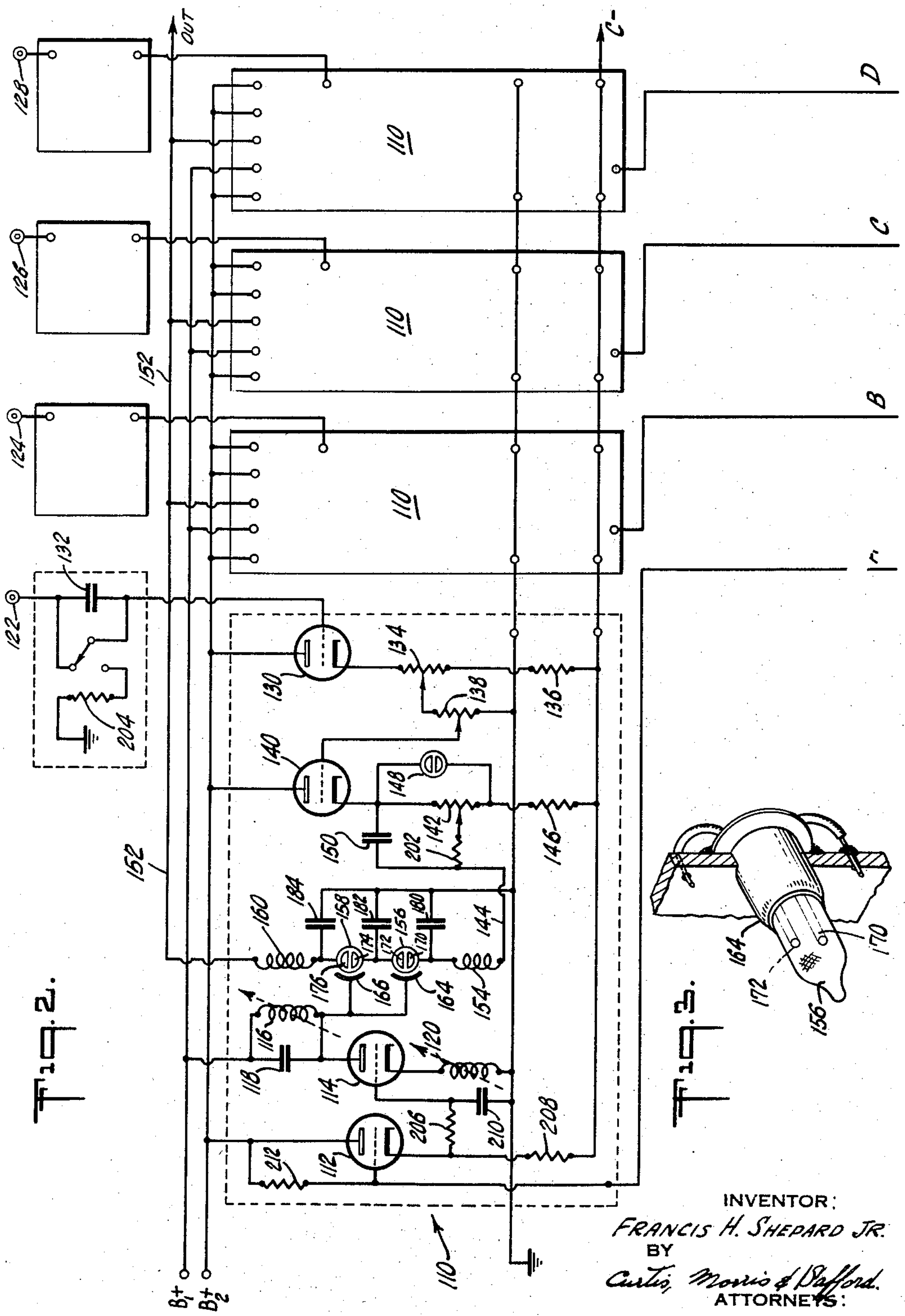

A better understanding of the invention together with a better appreciation of its many advantages will best be gained from the following description given in connection with the accompanying drawings in which:

Figures 1 and 2 are a single diagram of a four-channel switch circuit embodying features of the invention, the bottom of Figure 2 being a continuation of the top of Figure 1; and Figure 3 is a perspective view of the structure of a gas discharge tube arranged as an electric switch in accordance with an aspect of the invention.

Referring to Figure 1, a gas discharge thyratron 12 is connected as a relaxation oscillator to break down repeatedly and generate a saw-tooth wave. Connected to the cathode of tube 12 and to its plate via the small inductor 14 is a charging capacitor 16. A second capacitor 17 is arranged to be switched in parallel to increase the total charging time of the circuit when desired. Capacitor 16 is connected at its upper end to a positive voltage B via the tube 18 and is connected to ground at its lower end through the potentiometer 20 and the resistors 22 and 24.

The charging time of capacitor 16 is determined by its size, by the amount of resistance in series with it, and by the voltage difference across this resistance and capacitor 16 in series. To vary this charging time, not only is the resistance in circuit changed but the applied voltage is changed too so that an increase in resistance is accompanied by a decrease in voltage and vice versa. This is accomplished by connecting the variable tap 26 on potentiometer 20 to a negative voltage supply —C through the resistor 28. When tap 26 is at the top end of potentiometer 20, the charging voltage applied to capacitor 16 will be maximum while the resistance in series with it will be minimum. By making the resistance of potentiometer 20 many times greater than that of resistor 28, and the resistance of resistors 22 and 24 together much less than that of resistor 28, an extremely wide range of adjustment of the charging time of capacitor 16 is obtained.

Linearity of charging of capacitor 16 is obtained through the action of the high-mu triode tube 30 whose grid is connected to the lower plate of capacitor 16 and whose plate is connected, through the voltage dividing resistors 32 and 34, to the grid of tube 18. Resistors 32 and 34 are chosen relative to the voltages B and —C so that a proper operating bias is applied to the grid of tube 18 which acts as a cathode follower in applying variations in voltage at the plate of tube 30 to the upper terminal of capacitor 16.

The breakdown voltage of gas tube 12 is controlled within limits by the bias applied to its grid. This bias, for the circuit conditioned as shown, is obtained from the —C voltage supply through the resistor 36, connected in series with the grid of tube 12, the switch 38, and the resistors 40 and 42.

An external synchronizing signal can be applied to tube 12 to control within limits, its frequency of discharging. Such a signal reaches the grid of this tube through switch 38, the coupling capacitor 44, the potentiometer 46, the capacitor 47, and the input terminal 48. With switch 38 in its up position, the position shown, tube 12 will periodically break-down whether or not a synchronizing signal is applied to terminal 48.

With switch 38 in its lower position, the bias on the grid on tube 12 is set so that it discharges only when a trigger signal is applied to terminal 48. For greater reliability in triggering, the bias on the grid of tube 12 is made dependent on the setting of potentiometer 46. Thus, when using a large trigger signal, the tap on potentiometer 46 is moved nearer ground thereby decreasing the proportion of the trigger signal which is applied to tube 12 and at the same time increasing the bias. Potentiometer 46 is connected between the voltages B and —C in series with the resistors 50, 52, 54 and the potentiometer 56. This last is connected between —C and ground in series with the resistor 58. The setting of potentiometer 56 determines the center of the range of bias variation possible with potentiometer 46.

The cathode of gas tube 12 is prevented from drifting negative relative to its grid by the diode-connected tube 60 whose plate is connected to ground by the resistor 62, the resistance of this last element being small relative to that of resistor 42. This diode keeps the cathode of tube 12 from falling much below ground potential and thus clamps the cathode relative to ground as the charging current into capacitor 16 falls off.

When the capacitor 16 has charged to a sufficiently high voltage, tube 12 breaks down and discharges the capacitor. The surge of current through coil 14 causes the voltage at the cathode of tube 18 to fall well below zero relative to ground and thus functions to balance relative to ground the positive and negative peaks of saw-tooth output voltage which is obtained from this cathode. Since tube 18 functions as a cathode follower, this output voltage is not appreciably affected by the loading on the output terminal 64. The "spikes" which might otherwise be present on the negative peaks of the output voltage are filtered out by the small capacitor 66 connected between the grid of tube 18 and ground.

Voltage pulses synchronized with the sweep voltage at terminal 64 are obtained from the plate of tube 12 through the capacitor 68 and the positive-biased clipping triode 70. Sharp output pulses from this tube are obtained from its plate and applied to pulse output terminal 72 and also applied to the filter consisting of capacitors 74 and 76 and resistor 78, and thence to the grid of buffer tube 80.

The pulses applied to tube 80 are used to synchronize the switching from one channel to another of the four signal channels provided. The pulses are coupled from the cathode of tube 80 by the capacitor 82 to the cathodes of the tubes 84 and 86 arranged as a flip-flop of known kind and operation. Assuming that tube 84 is conducting, when a pulse is applied through capacitor 82, tube 84 will be made non-conducting and tube 86 conducting. The next pulse thereafter will then make tube 86 non-conducting and tube 84 conducting, and so on.

Output keying voltages are derived from the plates of tubes 84 and 86 and applied by the leads 90 and 92, respectively, to the counting matrix, known to the art, and indicated generally at 94. Output voltages from a second flip-flop, like the first and controlled by it, and consisting of tubes 96 and 98, are applied to matrix 94 by the leads 100 and 102 respectively. Thus, for a set of four pulses applied through capacitor 82 to the first flip-flop, the pairs of keying voltages on leads 90, 92, 100 and 102 combine in matrix 94 to give four successive voltages which can be selected by the four ganged switches generally indicated at 106 to apply to the output leads A, B, C and D incremental voltages in a pre-selected sequence. For the setting shown, switches 106 permit the voltage on lead A to be raised above its quiescent level for the short interval from a first pulse through capacitor 82 to the second, then the voltage on lead B to be raised for the next interval, then the voltage on lead C, then on lead D, then again on lead A, and so on again at the intervals determined by the pulses applied to the first flip-flop. Position 2 of switch 106, connects an incremental voltage to lead A, then to B, then to A, then to B. Position 3, selects leads A and C; position 4, leads A, D; position 5, lead B, C; position 6, leads B, D; position 7, leads C, D, and position 8, leads A, B, C, D.

Referring to Figure 2, the continuations of leads A, B, C, and D in Figure 1 extend respectively to each of the four switching groups indicated generally at 110. For simplicity, only one of these groups is shown, the others being identical to it. Each switch group includes a buffer amplifier tube 112 direct coupled to the grid of oscillator tube 114. This last is normally biased to cutoff but when the voltage on lead A is raised in accordance with the selection of switch 106, the oscillator is turned on and permitted to operate. The tank coil 116 in the plate circuit of tube 114 is resonant at a frequency determined by its own value and that of the parallel capacitor 118. Engery to sustain oscillation is fed back from coil 116 to the cathode coil 120 of tube 114. The turning on of this tube establishes a conductive circuit in the way now to be described.

Each one of four signals to be switched in sequence is applied to a respective one of the input terminals 122, 124, 126 and 128 of the switch groups 110. These signals may, for example, be obtained from a circuit being tested and are to be displayed in sequence on an oscilloscope. The signal applied to terminal 122, for example, can be applied directly to the grid of the buffer tube 130 or the signal can be applied to this grid through the capacitor 132. Each of the terminals 124, 126 and 128 is connected to its respective group 110 in the same way as terminal 122.

The cathode of tube 130 is connected through the potentiometer 134 and the resistor 136 to the negative voltage —C, the plate of tube 130 being connected to a positive voltage $B_2+$. The setting of potentiometer 134 is chosen so that for zero voltage on the grid of tube 130, zero voltage will appear across the potentiometer 138 which is connected to potentiometer 134. The signal from tube 130 is coupled through these potentiometers to the grid of tube 140, the setting of potentiometer 138 being used to adjust the gain.

A direct output voltage proportional to a direct voltage applied to terminal 122 is obtained from the cathode of tube 140 through the potentiometer 142 and the lead 144. Potentiometer 142 is in series with the tube cathode and the resistor 146 connected to −C. This potentiometer is bypassed with a gas discharge tube 148 which insures that the direct voltage drop across the potentiometer is constant. This potentiometer is used to adjust the direct voltage level or zero axis of the output signal. Alternating voltage is coupled from the cathode of tube 140 to lead 144 by the capacitor 150.

The voltage on lead 144 is not always connected to the single output lead 152 running from each of the groups 110 because the two leads are joined only through the R.F. choke 154, the gas discharge tubes 156 and 158 and the R.F. choke 160. When tubes 156 and 158 are not conductive there is an open circuit between leads 144 and 152.

Each of tubes 156 and 158 is rendered conductive by radio-frequency current applied to it from tube 114 when it is turned on. This current is applied to tubes 156, 158 by the conductive sleeves 164, 166, respectively, which are connected to coil 116.

As seen in Figure 3, sleeve 164 closely surrounds the envelope tube 156. When R.F. voltage is applied to this sleeve, R.F. current flows between the sleeve and the electrode 170, 172 within the tube and this causes ionization of the gas within the tube which permits conductive current flow between electrodes 170, 172. In the same way R.F. current flows between sleeve 166 and electrodes 174 and 176 of tube 158, thereby ionizing the gas within it. When the gas in tubes 156 and 158 is ionized a low resistance conductive circuit is established between leads 144 and 152 in Figure 2. By using two of these tubes, in series a high signal voltage on lead 144 can be accommodated. For lower voltages only a single gas discharge tube such as tube 156 need be used.

Referring to Figure 2, R.F. voltage is effectively eliminated from the conductive circuit of leads 144 and 152 by R.F. chokes 154, 160 and by the capacitors 180, 182, 184 which provide a low impedance path to ground for R.F. currents from electrodes 170, 172, 174, 176 of tubes 156, 158. Direct voltages of plus or minus 200 volts, roughly, can be switched with ease from terminals 122, 124, 126 and 128 to output lead 152. The input impedance at all times at these terminals is very high and there is effectively no leakage of signal from a terminal not switched "on" to the output lead 152.

Since, as explained previously, leads A, B, C and D controlling switch groups 110 are selectively energized with incremental voltages, the signals applied to the input terminals 122, 124, 126, 128 are switched in the same selected sequence onto the single output lead 152.

Numerous parts and elements shown in Figures 1 and 2 have not been referred to specifically in the foregoing description because it was not thought necessary in explaining the invention. For the sake of completeness, these parts and elements are identified by numbers over 200 and their values listed below.

In an actual model of the above circuit which has been built and successfully tested, the following types or values of circuit elements were used: B+, 250 volts; $B_1$+, 300 volts; $B_2$+, 350 volts; C—, −300 volts; tube 12, type 884; inductor 14, 470 μh.; capacitor 16, 0.002 μf.; capacitor 17, 0.25 μf.; tubes 18, 30, type 12AX7; potentiometer 20, 10 meg. ohms; resistor 22, 50,000 ohms; resistor 24, 27,000 ohms; resistor 28, 390,000 ohms; resistor 32, 680,000 ohms; resistor 34, 1 meg. ohm; resistor 36, 100,000 ohms; resistor 40, 100,000 ohms; resistor 42, 100,000 ohms; capacitor 44, 0.05 μf.; potentiometer 46, 100,000 ohms; capacitor 47, 0.05 μf.; resistor 50, 10 meg. ohms; resistor 52, 2.2 meg. ohms; resistor 54, 22 meg. ohms; potentiometer 56, 50,000 ohms; reisstor 58, 56,000 ohms; tubes 60, 70, type 12AU7; resistor 62, 2,700 homs; capacitor 66, 8–50 μμf.; capacitor 68, 200 μμf.; capacitor 74, 0.5 μf.; capacitor 76, 100 μμf.; resistor 78, 270,000 ohms; capacitor 82, 200 μμf.; tubes 80, 201, type 12AU7; tubes 84, 86, type 12AU7; tubes 96, 98, type 12AU7; tubes 112, 114, type 12AU7; capacitor 118, 50 μμf.; coils 116, 120, adjusted to give oscillation of about 4 mc.; tubes 130, 140, type 12AU7; capacitor 132, 0.05 μf.; potentiometer 134, 50,000 ohms; resistor 136, 100,000 ohms; potentiometer 138, 100,000 ohms; potentiometer 142, 50,000 ohms; resistor 146, 100,000 ohms; gas tube 148, type NE–2, capacitor 150, 0.01 μf.; coils 154, 160, 500 μh. each; gas tubes 156, 158, type NE–2 each; capacitors 180, 184, 100 μμf. each; capacitor 182, 200 μμf.; resistor 202, 50,000 ohms; resistor 204, 2.2 meg. ohms; resistor 206, 47,000 ohms; resistor 208, 100,000 ohms; capacitor 210, 200 μμf.; resistor 212, 3.3 meg. ohms; capacitor 214, 100 μμf.; resistor 216, 68,000 ohms; resistor 218, 150,000 ohms; resistor 220, 150,000 ohms; resistor 222, 22 meg. ohms; resistor 224, 27,000 ohms; capacitor 226, 300 μμf.; resistor 228, 230, 100,000 ohms each; resistors 232, 234, 236, 238, 470,000 ohms each; resistors 240, 242, 15,000 ohms each; capacitor 244, 200 μμf.; capacitor 246, 100 μμf.; resistor 248, 1 meg. ohm; resistors 250, 252, 254, 256, 560,000 ohms each; capacitors 258, 260, 262, 264, 50 μμf. each; resistors 266, 268, 270, 272, 27,000 ohms each; resistors 274, 276, 278, 280, 282, 284, 286, 288, 220,000 ohms each; and resistor 290, 22,000 ohms.

The above description is intended in illustration and not in limitation of the invention. Various minor changes in the embodiment illustrated may occur to thoe skilled in the art and these can be made without departing from the spirit or scope of the invention.

I claim:

1. A wide range sweep circuit comprising a capacitor charging and discharging circuit having a source of direct voltage, a capacitor and a potentiometer connected in series in a conductive path, a resistor connected between the movable tap on said potentiometer and said source, one point in said path being connected to return current to said source, and means to discharge said capacitor when the voltage across it reaches a given level, said elements being connected so that when said tap is at one end of said potentiometer the voltage at said tap is low and current can flow from said source to said capacitor through said potentiometer, and when said tap is at the other end of said potentiometer, said voltage is high and current can flow to said capacitor with less resistance than through said potentiometer.

2. In a wide range sweep circuit, a voltage source, a capacitor, and means connecting said capacitor to said source, said means including adjustable resistance-potentiometer means connected so that as the voltage acting to charge said capacitor is increased, the resistance in series with said capacitor and said voltage is decreased, and as the voltage is decreased, the resistance is increased whereby through adjustment of a single potentiometer a very wide range of charging time for said capacitor can be obtained.

3. In a wide range sweep circuit, a positive voltage lead, a negative voltage lead, a ground lead, a capacitor, conductive means connecting one end of said capacitor to said positive lead, a potentiometer having a fixed end connected to the other end of said capacitor, a resistor connected between the other fixed end of said potentiometer and said ground lead, a resistor connected between the adjustable tap on said potentiometer and said negative lead, and a gas discharge tube connected across said capacitor and adapted to break down when the voltage thereon reaches a given level.

4. The combination of elements as in claim 3 wherein said conductive means includes a first triode having its cathode connected to said capacitor and its plate connected to said positive lead, and also includes a second triode having its cathode connected to said ground lead, its plate connected through a resistor to said positive lead, and its grid connected to the lower voltage end of said capacitor, the grid of said first triode being direct coupled to the plate of said second triode.

5. The combination of elements as in claim 4 wherein said gas discharge tube is connected in series with a small coil across said capacitor.

6. The combination of elements as in claim 5 wherein said gas tube is a thyratron, the grid of which is biased and in further combination with means to apply a synchronizing signal to the grid of said thyratron, said means including a potentiometer adjustable to decrease when desired the amount of synchronizing signal and at the same time to increase the bias on said grid.

7. A wide range sweep circuit including a gas discharge tube having a plate and a cathode, a capacitor connected between said plate and cathode, resistance means connecting said cathode to a reference potential, a first triode having its plate connected to a positive potential and its cathode connected to said gas tube plate, a second triode having its plate connected via a resistor to said positive potential, its cathode connected to said reference potential, and its grid connected to said gas tube cathode, and resistance means biasing the grid of said first triode and also connecting it to the plate of said second triode.

8. The combination of elements as in claim 7 in further combination with resistance-potentiometer means connecting the cathode of said gas tube to a negative potential so that as the charging resistance in series with said cathode is increased, the voltage which can act to charge said capacitor is decreased and vice versa.

References Cited in the file of this patent

UNITED STATES PATENTS

| | | |
|---|---|---|
| 1,979,692 | Knowles | Nov. 6, 1934 |
| 2,144,779 | Schlesinger | Jan. 24, 1939 |
| 2,310,092 | Knowles et al. | Feb. 2, 1943 |
| 2,421,182 | Bayne | May 27, 1947 |
| 2,453,787 | Downs | Nov. 16, 1948 |
| 2,467,415 | Woodruff | Apr. 19, 1949 |
| 2,467,695 | Ponte | Apr. 19, 1949 |
| 2,558,102 | Roberts | June 26, 1951 |
| 2,604,589 | Burns | July 22, 1952 |
| 2,658,142 | St. Johns | Nov. 3, 1953 |
| 2,693,532 | Krienen | Nov. 2, 1954 |
| 2,700,093 | Gordon | Jan. 18, 1955 |
| 2,713,119 | Adler | July 12, 1955 |